(12) United States Patent
Milione et al.

(10) Patent No.: US 12,007,579 B2
(45) Date of Patent: Jun. 11, 2024

(54) MACHINE LEARNING BASED REGRESSION OF COMPLEX COEFFICIENTS OF A LINEAR COMBINATION OF SPATIAL MODES FROM MULTIMODE OPTICAL FIBER

(71) Applicant: NEC Laboratories America, Inc., Princeton, NJ (US)

(72) Inventors: Giovanni Milione, Monmouth Junction, NJ (US); Philip Ji, Cranbury, NJ (US); Eric Cosatto, Red Bank, NJ (US)

(73) Assignee: NEC CORPORATION, Tokyo (JP)

( * ) Notice: Subject to any disclaimer, the term of this patent is extended or adjusted under 35 U.S.C. 154(b) by 641 days.

(21) Appl. No.: 17/081,900

(22) Filed: Oct. 27, 2020

(65) Prior Publication Data

US 2021/0133512 A1   May 6, 2021

Related U.S. Application Data

(60) Provisional application No. 62/927,728, filed on Oct. 30, 2019.

(51) Int. Cl.
  *G02B 27/28*   (2006.01)
  *G06F 18/214*   (2023.01)
  *G06F 18/24*   (2023.01)
  *G06V 10/764*   (2022.01)
  *G06V 10/82*   (2022.01)

(52) U.S. Cl.
  CPC ......... *G02B 27/283* (2013.01); *G06F 18/214* (2023.01); *G06F 18/24* (2023.01); *G06V 10/764* (2022.01); *G06V 10/82* (2022.01)

(58) Field of Classification Search
  CPC ..... G02B 27/283; G06F 18/214; G06F 18/24; G06V 10/764; G06V 10/82
  USPC .......................................... 382/143; 398/143
  See application file for complete search history.

(56) References Cited

U.S. PATENT DOCUMENTS

| | | | | |
|---|---|---|---|---|
| 2006/0045450 A1* | 3/2006 | Bickham | ............ | G02B 6/03627 385/127 |
| 2009/0262337 A1* | 10/2009 | Nicholson | ............ | G01M 11/335 356/73.1 |
| 2010/0171945 A1* | 7/2010 | Gholami | ............... | G01M 11/338 356/73.1 |
| 2013/0173194 A1* | 7/2013 | Dholakia | ............... | G02B 27/58 702/71 |
| 2014/0098361 A1* | 4/2014 | Fini | ..................... | G01M 11/333 356/73.1 |

OTHER PUBLICATIONS

Yi An, "Accurate, Robust, and Fast Mode Decomposition For Few-Mode Optical Fiber With Deep Neural Network", Proc. SPIE 11048, 17th International Conference on Optical Communications and Networks (ICOCN2018), 110484Y (Feb. 14, 2019). (Year: 2019).*
Correspondent Japanese case JP2022546533 Notice of Reasons for Refusal (Translated) dated Mar. 7, 2023 (Year: 2023).*
Correspondent Japanese case JP2022546533 Written Amendment (Translated) dated May 15, 2023 (Year: 2023).*

* cited by examiner

*Primary Examiner* — Juan A Torres

(74) *Attorney, Agent, or Firm* — Joseph Kolodka

(57) ABSTRACT

Aspects of the present disclosure describe systems, methods, and structures for the machine learning based regression of complex coefficients of a linear combination of spatial modes from a multimode optical fiber.

19 Claims, 11 Drawing Sheets

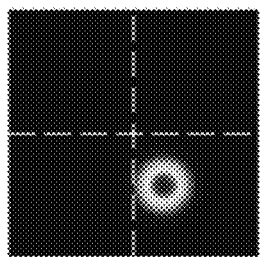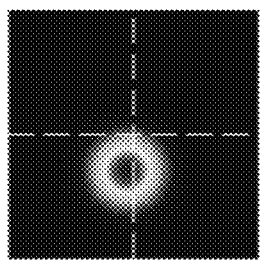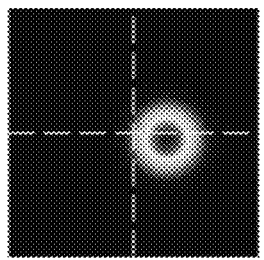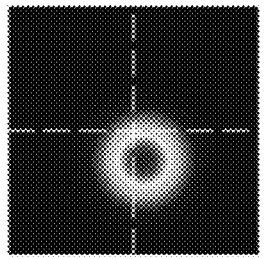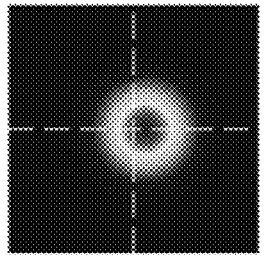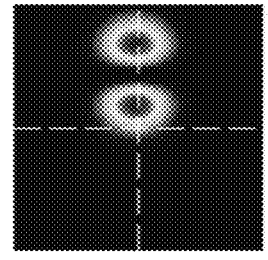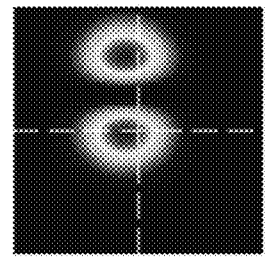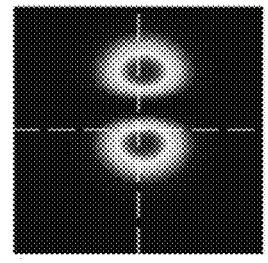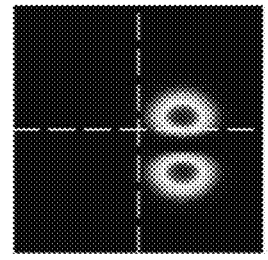
$HG_{00}$
$HG_{0,1}$
FIG. 5(A)
FIG. 5(B)

$HG_{1,1}$ $HG_{1,0}$

MACHINE LEARNING BASED REGRESSION OF COMPLEX COEFFICIENTS OF A LINEAR COMBINATION OF SPATIAL MODES FROM MULTIMODE OPTICAL FIBER

CROSS REFERENCE

This disclosure claims the benefit of U.S. Provisional Patent Application Ser. No. 62/927,728 filed Oct. 30, 2019, the entire contents of which is incorporated by reference as if set forth at length herein.

TECHNICAL FIELD

This disclosure relates generally to optical fiber imaging and communication. More particularly, it describes machine learning based regression of complex coefficients of a linear combination of spatial modes from multimode optical fiber.

BACKGROUND

As will be known and appreciated by those skilled in the art, spatial modes are mathematical functions that can be used to describe the transverse (i.e., perpendicular to the direction of propagation of the light beam) spatial dependence of the complex amplitude of the electric field of a light beam. These mathematical functions are solutions to an electromagnetic wave equation.

For example, the light beam of a conventional laser pointer is a spatial mode that is oftentimes referred to as the fundamental spatial mode, i.e., the lowest order solution to the wave equation. The spatial dependence of the intensity of the complex electric field amplitude of the fundamental spatial mode is characterized by being brightest at the beam's center and, becoming gradually less bright farther from the beam's center. However, there are high-order solutions to the wave equation, i.e., higher-order spatial modes.

The complex electric field amplitudes of higher-order spatial modes have more complex spatial dependencies. For example, there are higher-order spatial modes referred to as Hermite-Gaussian modes and Laguerre-Gaussian modes, which have ring-like and lobe-like spatial dependencies, respectively. Higher-order spatial modes can propagate through free space (e.g. Earth's atmosphere, outer space) and waveguides (e.g. optical fibers).

Recently, spatial modes are receiving significant interest. For example, spatial modes can be used to increase the data speeds of free space and optical fiber communication at a given wavelength (i.e., spectral efficiency), where each higher-order spatial mode is used as a data state with which to encode data or, a channel over which data is encoded otherwise. Also, higher-order spatial modes can be used to enhance image resolution in microscopy, where image resolutions beyond wavelength dependent limits can be achieved via illumination with higher-order spatial modes (i.e., super-resolution).

For any spatial mode, its classification is often necessary, especially with respect to the applications noted above. For fundamental spatial modes, classification comprises characterization of the spatial modes' quality via the so-called $M^2$ factor, i.e., a product of the beams' measured size and divergence. However, higher-order spatial modes are more various and, the complex amplitude of the electric field of each has more complex spatial dependence. Therefore, classification of higher-order spatial modes requires a more complex spatial analysis including, differentiation of the high-order spatial modes from each other. Measurement of the $M^2$ factor is not sufficient.

Additionally, a light beam can be a linear combination (superposition) of multiple higher-order spatial modes, where each spatial mode has a different complex coefficient, i.e., each spatial mode has a different amplitude and phase. Classification requires determination of those complex coefficients, i.e., determination of the amplitudes and phases of each spatial mode in the linear combination. This is especially important in, for example, analyzing the effects of atmospheric turbulence on spatial modes when they are used for free-space optical communication. This is also important in analyzing the effects of mode coupling in a multimode optical fiber when spatial modes are used for optical fiber communication.

Canonical systems and methods to classify higher-order spatial modes comprise indirect measurement of the complex amplitude of a light beam's electric field. Typically, the complex amplitude of a light beam is indirectly measured using interferometry or, holographic techniques via unconventional optical devices/elements. Such unconventional optical devices/elements must emulate the complex spatial dependencies of the complex amplitudes of the electric fields of higher-order spatial modes. Unconventional optical devices/elements include, liquid crystal or micro-mirror based spatial light modulators or, custom reflective, refractive or, diffractive optical elements (e.g. spiral phase plates, q-plate, fork diffraction grating, meta-material).

While effective, interferometry or, complex holographic techniques via unconventional optical devices/elements may have prohibitive complexity, i.e., dependence on a light beam's alignment, size, wave front (e.g. curvature, etc.), polarization, and wavelength. Additionally, unconventional optical devices/elements may have prohibitive cost and efficacy. They require quality of fabrication that depends on how well the complex spatial dependencies of the complex amplitudes of the electric fields of higher-order spatial modes can be emulated.

In general, a light beam from a multimode optical fiber has a complex electric field amplitude that has more than one orthogonal polarization components, where the complex electric field amplitude of each polarization component is a different linear combination of higher-order spatial modes. As such, the complex electric field amplitudes of each polarization component must be classified. Therefore, systems and methods are required, wherein: classification of high-order spatial modes from a multimode optical fiber does not require indirect measurement of the complex amplitude of a light beam's electric field using interferometry or, holographic techniques via unconventional optical devices/elements, which have prohibitive cost and efficacy; classification of high-order spatial modes from a multimode optical fiber is not dependent on a light beam's alignment, size, wave front (e.g. curvature, etc.), polarization, or wavelength, which has prohibitive cost and efficacy; classification of higher-order spatial modes from a multimode optical fiber does not require a prohibitive amount of experimentally generated training examples, which, in turn, has prohibitive efficacy; and the light beam from a multimode optical fiber can be separated into more than one polarization components, such that, the different linear combination of higher order spatial modes comprising each polarization component can be classified separately.

Given such need, the prior art has attempted to resolve some of the noted deficiencies.

United States Patent Application Publication US 2015/0292941 A1 entitled "Modal Decomposition of a Laser Beam," discloses a system and method to classify higher-order spatial modes that uses holographic techniques via an unconventional optical device referred to as a spatial light modulator. A light beam of interest is made to illuminate the display of a spatial light modulator. The spatial light modulator displays a hologram corresponding to a spatial mode or spatial modes. The hologram modulates the complex amplitude of the electric field of the light beam. Then, the light beam is Fourier transformed upon focusing by a lens. The higher-order spatial mode that the light beam is can be classified by detecting the power of the transformed light beam. While arguably effective, the systems and methods disclosed requires the use of an unconventional optical device, i.e., a spatial light modulator. Additionally, the systems and methods are dependent on light beam alignment, size, wave front (e.g. curvature, etc.), polarization, and wavelength. If the alignment, size, wave front (e.g. curvature, etc.), polarization, and wavelength are not that which is required by the spatial light modulator or, its displayed hologram, the light beam may be classified as the incorrect spatial mode.

United States Patent Application Publication US 2017/0010463 A1 entitled "Device for processing light/optical radiation, method and system for designing such a device", discloses a system and method to classify higher-order spatial modes, where multiple custom reflective optical elements comprising a cavity are used. A light beam of interest is made to enter the cavity and reflect back and forth off of the elements. After a sufficient number of reflections, the light beam exits the cavity. The reflective surfaces of the elements are made such that they modify the complex amplitude of the electric field of the light beam. After exiting the cavity, the higher-order spatial mode that the light beam is can be classified by detecting the power of the modified light beam. This system and method requires the use of custom reflective optical elements and, is dependent on the light beam's alignment, size, wave front (e.g. curvature, etc.), polarization, and wavelength. If the alignment, size, wave front (e.g. curvature, etc.), polarization, and wavelength are not that required by the cavity or, its custom reflective optical elements, the light beam may not reflect off of the elements properly, and the light beam's complex electric field amplitude may not be modified properly. In turn, the light beam may be classified as an incorrect higher-order spatial mode.

United States Patent Application Publication US20180262291A1 entitled "Method for free space optical communication utilizing patterned light and convolutional neural networks" discloses a system and method to classify higher-order spatial modes, where a light beam is incident to an image capturing device, which captures an image of the transverse spatial dependence of the intensity of the light beam. The captured image of the transverse spatial dependence of the intensity of the light beam is classified using a neural network. The disclosed system and method are dependent on the light beam's alignment and size. For example, a type of neural network referred to as a convolutional neural network can have a network layer referred to as pooling. Pooling depends on the sizes of the kernel (i.e., the convolutional filter) and the stride (i.e., the pixel interval that the kernel is translated between subsequent convolutions) that are used. Effectively, a convolution neural network that uses a pooling layer is sensitive to variations of size and alignment of a few pixels. The light beam may be classified as an incorrect higher-order spatial mode when it is misaligned by a few pixels. In addition, the disclosed system and method require the neural network to be trained by experimentally acquiring training examples. Experimentally acquired training examples generally involves experimentally captured images of the transverse, spatial dependencies of the intensities of higher-order spatial modes. For example, for a convolutional neural network, 1000 s of experimentally captured images are required for each higher-order spatial mode that requires classification. As such, the use of experimentally captured training examples may be prohibitive. Furthermore, this disclosed system and method cannot classify the higher-order spatial modes of a light beam from a multimode optical fiber because, a light beam from a multimode optical fiber has a complex electric field amplitude that has more than one polarization components, where the complex electric field amplitude of each polarization component is a linear combination of higher-order spatial modes. As such, the complex electric field amplitude of each polarization component must be classified separately.

U.S. Pat. No. 8,320,769B2 entitled "Transverse-mode multiplexing for optical communication systems" discloses a system and method to separate a light beam emitted from a multimode optical fiber into its two orthogonal polarization components using polarization optical elements. However, the light beam's alignment, size, and wave front must NOT vary with respect to the polarization optical elements. Additionally, this system and method requires the use of, for example, an unconventional optical device, i.e., a spatial light modulator, being dependent on the light beam's alignment, size, wave front (e.g. curvature, etc.), polarization, and wavelength, i.e., if the alignment, size, wave front (e.g. curvature, etc.), Finally, in an article entitled "Accurate, Robust, and Fast Mode Decomposition For Few-Mode Optical Fiber With Deep Neural Network", authored by Yi An, Liangjin Huang, Jun Li, Jinyong Leng, Lijia Yang, Pu Zhou, that appeared in Proc. SPIE 11048, 17th International Conference on Optical Communications and Networks (ICOCN2018), 110484Y (14 Feb. 2019); there is disclosed a system and method to classify higher-order spatial modes, where a light beam is incident to an image capturing device, which captures an image of the transverse spatial dependence of the intensity of the light beam. The captured image of the transverse spatial dependence of the intensity of the light beam is classified using a convolutional neural network. Arguably effective, the disclosed system and method are dependent on the light beam's alignment and size. For example, a type of neural network referred to as a convolutional neural network can have a network layer referred to as pooling. Pooling depends on the sizes of the kernel (i.e., the convolutional filter) and, the stride (i.e., the pixel interval that the kernel is translated between subsequent convolutions) that are used. Effectively, a convolution neural network that uses a pooling layer is sensitive to variations of size and alignment of a few pixels. The light beam may be classified as an incorrect higher-order spatial mode when it is misaligned by a few pixels. Additionally, this disclosed system and method cannot classify the higher-order spatial modes of a light beam from a multimode optical fiber because, a light beam from a multimode optical fiber has a complex electric field amplitude that has more than on orthogonal polarization components, where the complex electric field amplitude of each polarization component is a linear combination of higher-order spatial modes. As such, the complex electric field amplitude of each polarization component must be classified separately.

SUMMARY

The above problems are solved and an advance in the art is made according to aspects of the present disclosure directed to systems, methods, and structures including a novel machine learning based method to decompose a light beam into its constituent spatial modes. According to an aspect of the present disclosure, a convolutional neural network is trained using numerically calculated intensity images of linear combinations of Hermite-Gaussian and Laguerre-Gaussian modes.

Advantageously—and in sharp contrast to the prior art—it is disclosed that when a convolutional neural network is applied to a single intensity image of a light beam—as recorded with a conventional camera—that light beam can be decomposed into the powers of Hermite-Gaussian and Laguerre-Gaussian modes. Furthermore, it is shown that the light beam can be accurately decomposed even when the relative phases between the Hermite-Gaussian and Laguerre-Gaussian modes are unknown. A comparison of this method with canonical methods is then discussed.

According to aspects of the present disclosure, an image capture device captures image data of the transverse, spatial dependencies of the intensities of the of more than one of orthogonal polarization components of a light beam from a multimode optical fiber. The light beam's alignment, size, wave front, and wavelength may vary with respect to the image capture device. Using polarization optical elements, the transverse, spatial dependencies of the intensities of the more than one orthogonal polarization components of the light beam are separated and captured separately by the image capture device.

According to further aspects of the present disclosure, using a machine learning based classifier, a processor classifies the image data of the transverse, spatial dependencies of the intensities of the more than one polarization components of the light beam from the multimode optical fiber, whose alignment, size, wave front, and wavelength vary with respect to the image capture device. Advantageously, the classifier is trained off-line using synthesized training examples of higher-order spatial modes, comprising varying alignments, sizes, and wave fronts, and using synthesized training examples of various linear combinations of higher-order spatial modes, i.e., each mode in the linear combination having a different complex coefficient, which comprises a different amplitude and phase of each higher-order spatial mode.

Advantageously, and according to an aspect of the present disclosure, classification of high-order spatial modes from a multimode optical fiber does not require indirect measurement of the complex amplitude of a light beam's electric field using interferometry or, holographic techniques via unconventional optical devices/elements, which have prohibitive cost and efficacy.

Additionally, and according to another aspect of the present disclosure, classification of high-order spatial modes from a multimode optical fiber is not dependent on a light beam's alignment, size, wave front (e.g. curvature, etc.), polarization, or wavelength, which has prohibitive cost and efficacy.

Further, and according to yet another aspect of the present disclosure, classification of higher-order spatial modes from a multimode optical fiber does not require a prohibitive amount of experimentally generated training examples, which, in turn, has prohibitive efficacy.

Finally, and according to still another aspect of the present disclosure, the light beam emitted from a multimode optical fiber is separated into more than one orthogonal polarization component, such that, the different linear combination of higher order spatial modes comprising each polarization component can be classified separately.

As we shall show and describe—and of particular advantage over the prior art—systems, methods, and structures according to an aspect of the present disclosure advantageously exhibit that: classification of high-order spatial modes from a multimode optical fiber does not require indirect measurement of the complex amplitude of a light beam's electric field using interferometry or, holographic techniques via unconventional optical devices/elements, which have prohibitive cost and efficacy; classification of high-order spatial modes from a multimode optical fiber is not dependent on a light beam's alignment, size, wave front (e.g. curvature, etc.), polarization, or wavelength, which has prohibitive cost and efficacy; classification of higher-order spatial modes from a multimode optical fiber does not require a prohibitive amount of experimentally generated training examples, which, in turn, has prohibitive efficacy; and the light beam from a multimode optical fiber can be separated into more than one polarization component, such that, the different linear combination of higher order spatial modes comprising each polarization component can be classified separately.

BRIEF DESCRIPTION OF THE DRAWING

A more complete understanding of the present disclosure may be realized by reference to the accompanying drawing in which:

FIG. 1(A), FIG. 1(B), FIG. 1(C), and FIG. 1(D) are schematic diagrams illustrating a cross sectional views of a multimode optical fiber core in which: FIG. 1(A) the multimode optical fiber core has circular geometry; FIG. 1(B) the multimode optical fiber core has ring-like geometry; FIG. 1(C) the multimode optical fiber core has elliptical geometry; and FIG. 1(D) the multimode optical fiber has more than one core; according to aspects of the present disclosure;

FIG. 2(A), FIG. 2(B), and FIG. 2(C) are plots illustrating a series of higher-order spatial modes for both phase and intensity in which: FIG. 2(A) is Hermite-Gaussian; FIG. 2(B) is Laguerre-Gaussian; and FIG. 2(C) linearly polarized according to aspects of the present disclosure;

FIG. 5(A), FIG. 5(B), FIG. 5(C), and FIG. 5(D) are a series of numerically calculated and plotted transverse, spatial dependencies of the intensities of higher order spatial modes according to aspects of the present disclosure;

Figure 1A:
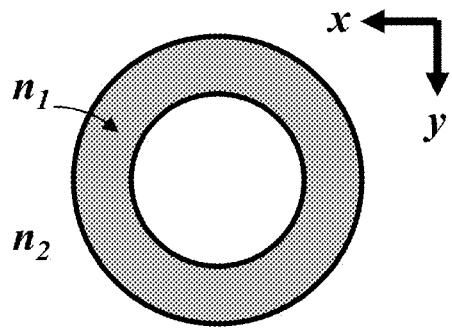

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that spatial modes, such as Hermite-Gaussian and Laguerre-Gaussian modes, are orthogonal sets of solutions to the electromagnetic wave equation and describe the electromagnetic field of a light beam transverse to its direction of propagation. Spatial modes have received recent interest, as they can be used to increase the data speeds of free space optical communication and optical fiber communication, enhance the sensitivity of lidar, and improve the resolution of microscopy. Regardless of the application, the experimental decomposition of a light beam, being a linear combination of spatial modes, into the powers of those constituent spatial modes is obligatory.

Canonical methods comprise the use of specialty optical devices, such as, spatial light modulators, and other specially patterned optical elements, e.g. metasurfaces. While effective, such methods may be prohibitive due to cost, form factor, and/or complexity.

As noted, we disclose herein a novel machine learning based method to decompose a light beam into its constituent spatial modes, which advantageously utilizes a conventional camera. A convolutional neural network is trained using numerically calculated intensity images of linear combinations of Hermite-Gaussian and Laguerre-Gaussian modes.

As we shall show and describe—according to aspects of the present disclosure—when that convolutional neural network is applied to a single intensity image of a light beam, as recorded with the conventional camera, that light beam can be decomposed into the powers of Hermite-Gaussian and Laguerre-Gaussian modes. Furthermore, we show and describe that—surprisingly—the light beam can be accurately decomposed even when the relative phases between the Hermite-Gaussian and Laguerre-Gaussian modes are unknown. A comparison of this method with canonical methods is discussed.

As noted previously, we disclose a novel machine learning based method to decompose a light beam into its constituent spatial modes, which utilizes only a conventional camera. A convolutional neural network is trained using numerically calculated intensity images of linear combinations of Hermite-Gaussian and Laguerre-Gaussian modes. It is shown that when that convolutional neural network is applied to a single intensity image of a light beam, as recorded with the conventional camera, that light beam can be decomposed into the powers of Hermite-Gaussian and Laguerre-Gaussian modes. Furthermore, it is shown that the light beam can be accurately decomposed even when the relative phases between the Hermite-Gaussian and Laguerre-Gaussian modes are unknown. A comparison of this method with canonical methods is presented and discussed.

Operationally—according to aspects of the present disclosure—an image capture structure captures an image of the transverse, spatial dependencies of the intensities of the more than one polarization components of a light beam emitted from a multimode optical fiber. As those skilled in the art will appreciate, the light beam's alignment, size, and wave front, and wavelength vary with respect to the image capture device. Using polarization optical elements, the transverse, spatial dependencies of the intensities of the more than one orthogonal polarization components of the light beam are separated and captured separately.

The multimode optical fiber supports N higher-order spatial modes, where N=1, 2, . . . per more than one polarization component. The transverse cross section of the optical fiber comprises regions that have indices of refraction, given by $n_2$ and $n_1$ referred to as the core and the cladding, respectively. $n_2$ and $n_1$ may be a function of the transverse spatial coordinates, given by (x, y), i.e., $n_2(x, y)$ and $n_1(x,y)$.

Figure 1B:
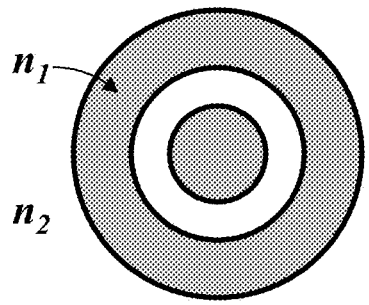
Figure 1C:
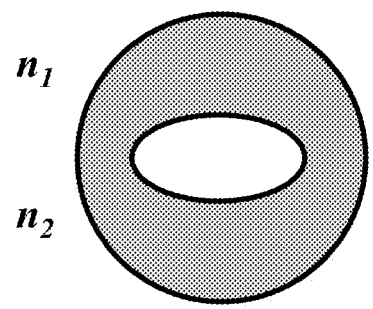
Figure 1D:
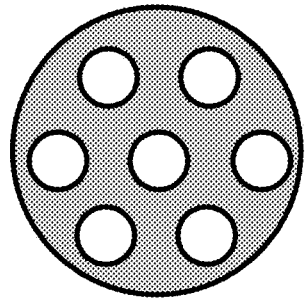

FIG. 1(A), FIG. 1(B), FIG. 1(C), and FIG. 1(D) are schematic diagrams illustrating a cross sectional views of a multimode optical fiber core in which: FIG. 1(A) the multimode optical fiber core has circular geometry; FIG. 1(B) the multimode optical fiber core has ring-like geometry; FIG. 1(C) the multimode optical fiber core has elliptical geometry; and FIG. 1(D) the multimode optical fiber has more than one core; according to aspects of the present disclosure.

The light beam from the multimode optical fiber has a complex electric field amplitude that has more than one polarization components where the complex electric field amplitude of each polarization component is a linear combination of higher-order spatial modes, given by the equation:

$$\overline{u}(x, y) = \sum_{m=0}^{m_{total}} \sum_{n=0}^{n_{total}} c_{m,n}^x HG_{m,n}^x(x, y)\overline{x} + c_{m,n}^y HG_{m,n}^y(x, y)\overline{y}, \quad (1a)$$

$$u^x(x, y) = \sum_{m=0}^{m_{totalx}} \sum_{n=0}^{n_{totalx}} c_{m,n}^x HG_{m,n}^x(x, y), \quad (1b)$$

$$u^y(x, y) = \sum_{m=0}^{m_{totaly}} \sum_{n=0}^{n_{totaly}} c_{m,n}^y HG_{m,n}^y(x, y), \quad (1c)$$

where the light beam is propagating in the z-direction, (x, y) are rectangular coordinates, and:

$$c_{m,n}^{x} = |c_{m,n}^{x}| \exp(i\varphi_{m,n}) \tag{1d}$$

$$c_{m,n}^{y} = |c_{m,n}^{y}| \exp(i\varphi_{m,n}) \tag{1e}$$

are the complex coefficients of the higher-order spatial modes in the linear combination, i.e., the amplitudes and phases of each higher-order spatial mode being $|c_{m,n}^{y}|$ and $\exp(i\varphi_{m,n})$, respectively.

The total number of spatial modes is given by: $N = m_{totalx} + m_{totaly} + n_{totalx} + n_{totaly} + 1$.

Figure 2A:
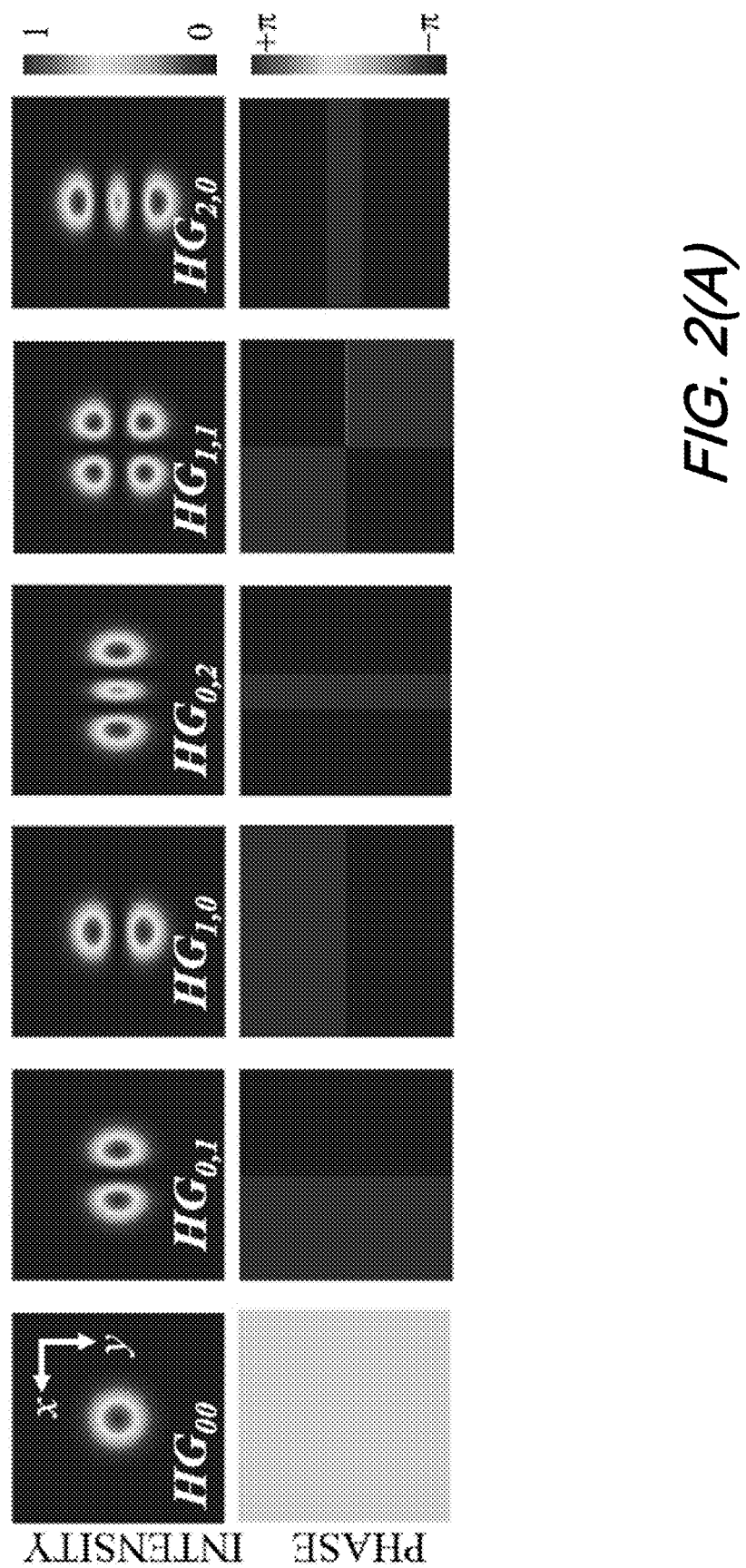

*In Equation 1, Hermite-Gaussian modes (FIG. 2(A)) are used to describe high-order spatial modes. Note however, that other higher-order spatial modes can also be used, e.g. Laguerre-Gaussian modes (FIG. 2(B), and "linear polarized mode," (FIG. 2(C)) "vector modes," etc. as shown.

Figure 2B:
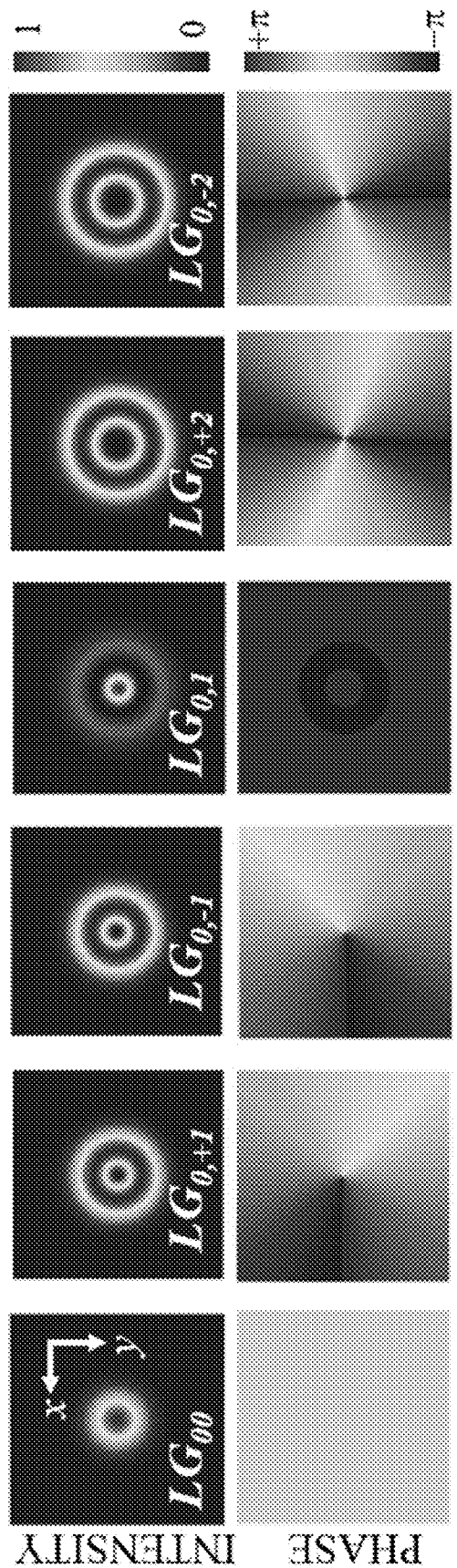
Figure 2C:
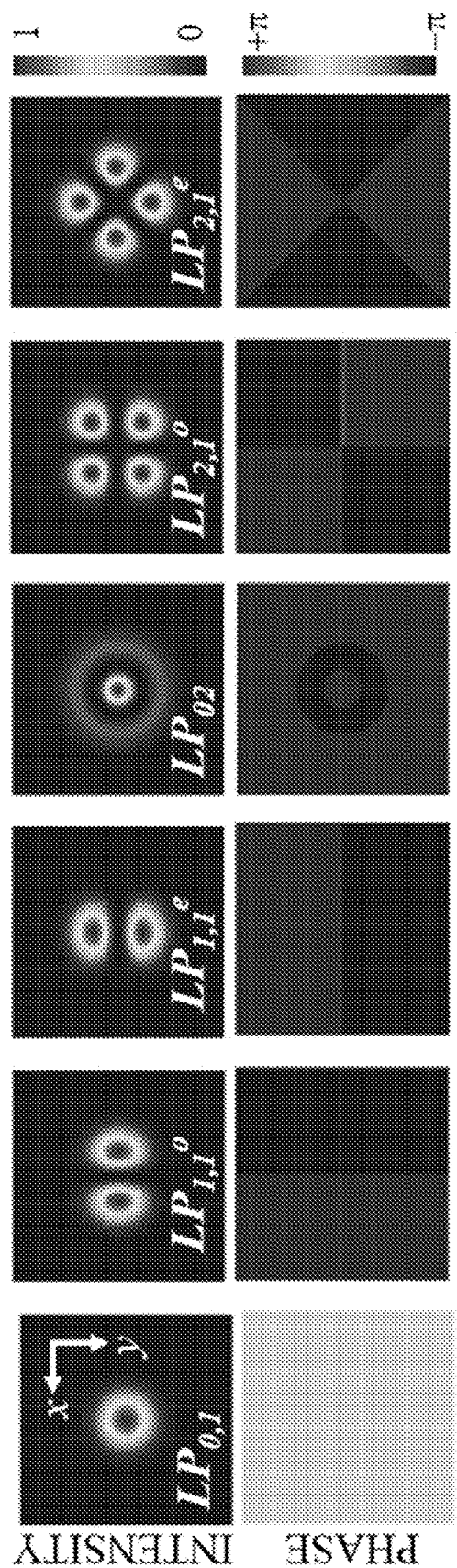

As will be understood, Higher-order spatial modes such as those illustrated in FIG. 2(A), FIG. 2(B), and FIG. 2(C), are mathematical functions that can describe the transverse spatial dependence of the complex amplitude of a light beam, as shown above. The mathematical functions are solutions to an electromagnetic wave equation. The electromagnetic wave equation can consider the boundary conditions of an optical fiber. For example, the Helmholtz wave equation is given by:

$$\nabla^2(x,y)\vec{u}(x,y) + k^2 \vec{u}(x,y) = 0, \tag{2}$$

where $\nabla(x, y)$ is a gradient in rectangular coordinates and, $k=2\pi/\lambda$, where $\lambda$ is the light beam's wavelength.

Hermite-Gaussian modes—such as those illustrated in FIG. 2(A)—are higher-order spatial modes that are solutions to a wave equation in rectangular coordinates. Hermite-Gaussian modes are given by the equation:

$$HG_{m,n}(x, y) = c_{m,n} H_m\left(\frac{x\sqrt{2}}{w}\right) H_n\left(\frac{y\sqrt{2}}{w}\right) \exp\left(\frac{-x^2 - y^2}{w^2}\right), \tag{3}$$

where $H_m(\ldots)$ and $H_n(\ldots)$ are Hermite polynomials, w is the waist size of the higher-order spatial modes, $c_{m,n}$ are complex coefficients, and m,n=0, 1, 2, ....

The transverse, spatial dependencies of the intensities of Hermite-Gaussian modes are given by $|HG_{mn}(x,y)|^2$. The transverse, spatial dependencies of the intensities of $HG_{00}$, $HG_{00}$, $HG_{01}$, $HG_{10}$, $HG_{11}$, $HG_{02}$, $HG_{20}$ are shown in FIG. 2(A).

Laguerre-Gaussian modes—such as those illustrated in FIG. 2(B)—are higher-order spatial modes that are solutions to a wave equation in polar coordinates. Laguerre-Gaussian modes are given by:

$$LG_{l,p}(r, \theta) = c_{l,p} \exp\left(-\frac{r^2}{w^2}\right)\left(\frac{r\sqrt{2}}{w}\right)^{|l|} L_{l,p}\left(\frac{2r^2}{w^2}\right) \exp(il\theta), \tag{4}$$

where (r,θ) are polar coordinates, $L_{l,p}(\ldots)$ are generalized Laguerre polynomials, w is the waist size each spatial mode, $c_{l,p}$ are complex coefficients, and l=0, ±1, ±2, ... ; p=0, 1, 2, ....

The transverse, spatial dependencies of the intensities of Laguerre-Gaussian modes are given by $|LG_{l,p}(r,\theta)|^2$. The transverse, spatial dependencies of the intensities of $LG_{0,0}$, $LG_{0,+1}$, $LG_{0,-1}$, $LG_{0,+2}$, $LG_{0,-2}$ are shown in FIG. 2(B).

Higher-order spatial modes—such as those illustrated in FIG. 2(C)—can also be "linearly polarized" modes, "vector" modes, or any other higher-order spatial modes that are solutions to the electromagnetic wave equation, which takes into account the boundary conditions of an optical fiber.

Note that there are multiple polarization components of the complex amplitude of the electric field of the light beam from the multimode optical fiber. The multiple components can be: 1) Horizontal and vertical states of polarizations, e.g., they are oriented 0 and 90 degrees, respectively, with respect to the x-axis, given by $\vec{x}$ and $\vec{y}$, respectively; 2) Diagonal and anti-diagonal states of polarizations, e.g., they are oriented 45 and 135 degrees, respectively, with respect to the x-axis given by $\vec{d} = (\vec{x} + \vec{y})/\sqrt{2}$ and $\vec{a} = (\vec{x} - \vec{y})/\sqrt{2}$, respectively; and 3) Right circular and left circular states of polarizations are given by $\vec{r} = (\vec{x} + i\vec{y})/\sqrt{2}$ and $\vec{l} = (\vec{x} - i\vec{y})/\sqrt{2}$.

Figure 3A:
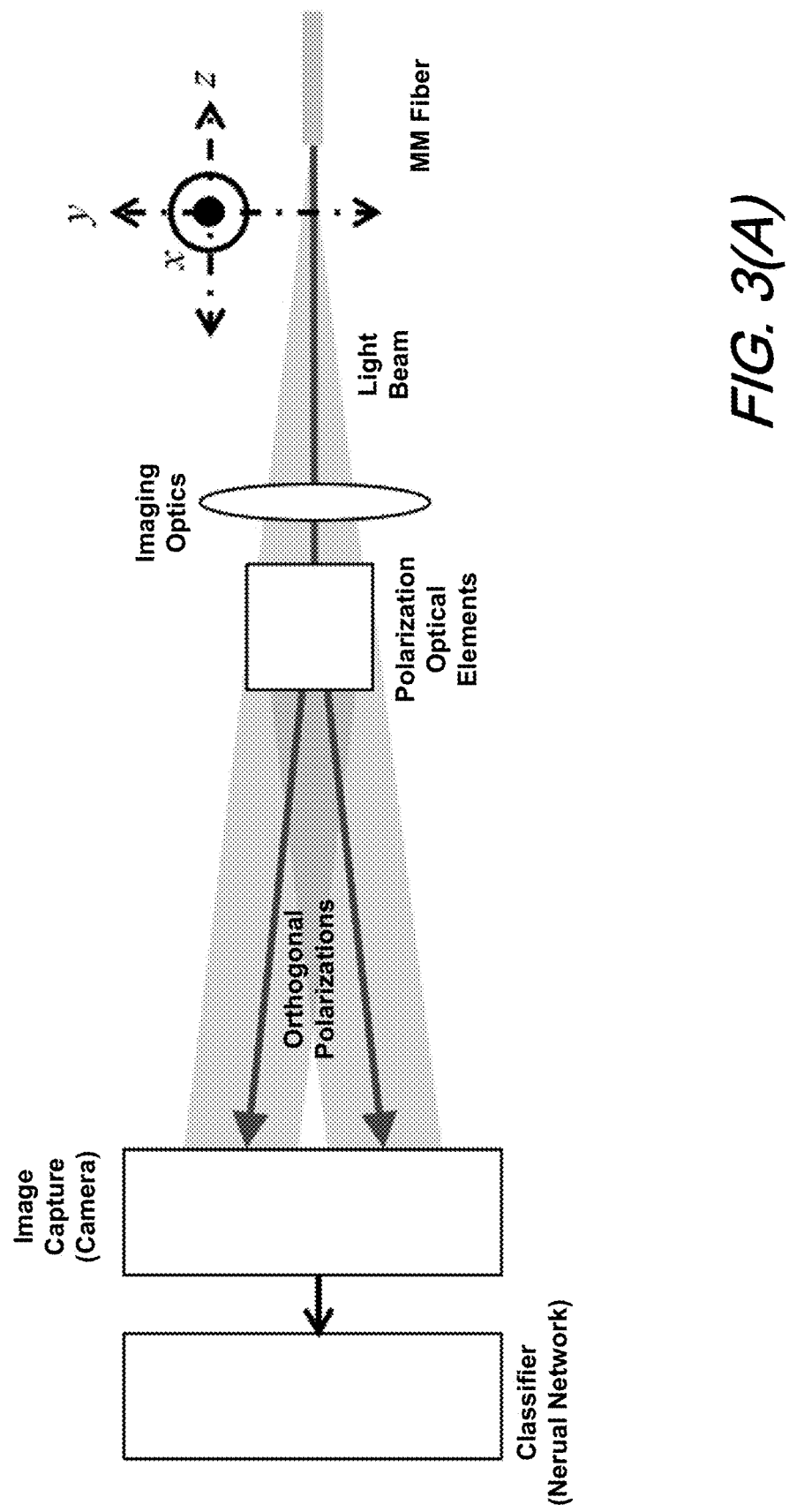
FIG. 3(A) shows a schematic block diagram of an illustrative imaging arrangement according to aspects of the present disclosure.

FIG. 3(A) shows a schematic block diagram of an illustrative imaging and classifier arrangement according to aspects of the present disclosure.

With reference to that figure, it may be observed that a light beam is emitted from a multimode optical fiber and directed to imaging optics, which may advantageously comprise no lenses, a single lens or, a combination of multiple lenses, image the higher-order order spatial modes of more than one polarization component onto the image capture device. Advantageously, the multimode optical fiber is not placed at the individual focal planes or, the effective focal planes of the single lens or, combination of multiple lenses, where the wave front of the light beam acquires aberration (e.g. curvature), given by Equation 7, as it propagates through the single lens or, combination of multiple lenses. The light is split into orthogonal polarizations through the effect of polarization optical elements and directed to an image capture device which may advantageously be a camera. The image(s) so captured may be classified and further analyzed by neural network classifier.

Figure 3B:
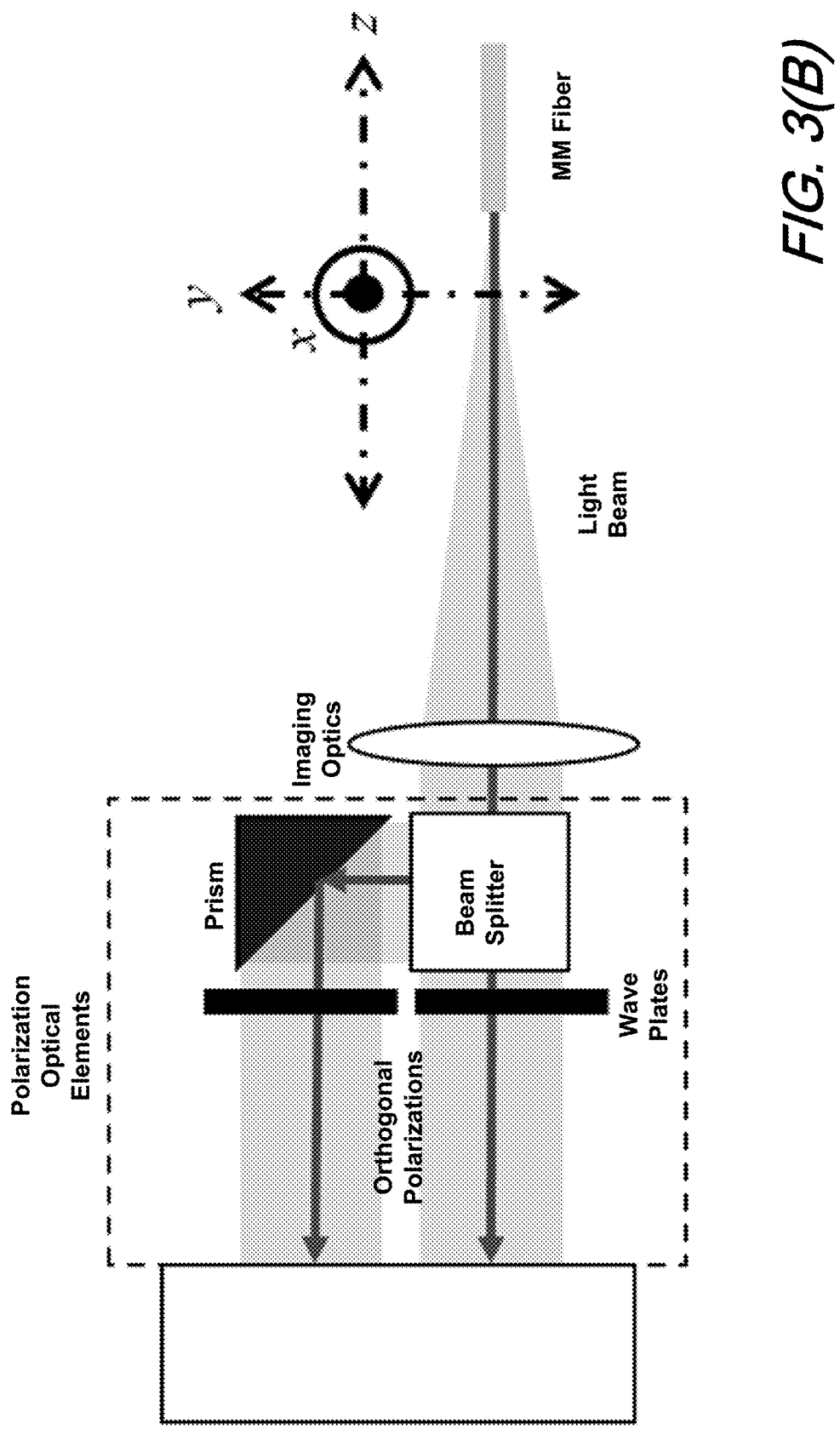
FIG. 3(B) shows a schematic block diagram of an illustrative polarization splitter arrangement that may be part of the overall imaging arrangement of FIG. 3(A), according to aspects of the present disclosure.

It is important to note that the prior art requires proper alignment of imaging optics. In sharp contrast and according to aspects of the present disclosure, proper alignment of imaging optics is not necessary FIG. 3(B) shows a schematic block diagram of an illustrative polarization splitter arrangement that may be part of the overall imaging arrangement of FIG. 3(A), according to aspects of the present disclosure. Similar to that arrangement previously shown, this figure explodes illustrative polarization optical elements.

As noted, polarization optical elements separate the transverse, spatial dependencies of the intensities of the more than one polarization components of the light beam from the multimode optical fiber. More particularly, such separation of the polarization components may advantageously include for analysis: the $\vec{l}$ polarization component of the light beam from the multimode optical fiber; the $\vec{y}$ polarization component of the light beam from the multimode optical fiber; the $\vec{d}$ polarization component of the light beam from the multimode optical fiber; the $\vec{a}$ polarization component of the light beam from the multimode optical fiber; the $\vec{r}$ polarization component of the light beam from the multimode optical fiber; and the $\vec{l}$ polarization component of the light beam from the multimode optical fiber.

While not all shown in the illustrative arrangement in the figure, those skilled in the art will understand and appreciate that polarization optical elements may include: Polarization beam splitters, such as: Wire grid polarizing cube; Fresnel prism, Glan-Thompson prism, Wollaston prism, Meta material polarization beam splitter, Liquid crystal polarization beam splitter, Combination of non-polarizing beam splitters and thin-film or crystal linear polarizers, and Wave plates (half-wave, quarter-wave, adjustable wave).

Images of the transverse, spatial dependence of the intensity of the more than one polarization components of the complex amplitude of the electric field of the light beam from the multimode optical fiber are subsequently directed to, and incident on an image capture device.

The image capture device captures the transverse, spatial dependence of the intensity of the $\vec{x}$ polarization component of the complex amplitude of the electric field of the light beam from the multimode optical fiber, given by Equation 5a.

$$I^x(x,y) = |\vec{u}(x,y) \cdot \vec{x}|^2 \tag{5a}$$

The image capture device captures the transverse, spatial dependence of the intensity of the of the $\vec{y}$ polarization component of the complex amplitude of the electric field of the light beam from the multimode optical fiber, given by Equation 5b.

$$I^y(x,y) = |\vec{u}(x,y) \cdot \vec{y}|^2 \tag{5b}$$

The image capture device captures the transverse, spatial dependence of the intensity of the transverse, spatial dependence of the intensity of the diagonal, $\vec{d} = (\vec{x} + \vec{y})/\sqrt{2}$, polarization component of the light beam from the multimode optical fiber, $I^d(x, y)$, given by the Equation:

$$I^d(x,y) = |\vec{u}(x,y) \cdot \vec{d}|^2 \tag{5c}$$

The image capture device captures the transverse, spatial dependence of the intensity of the transverse, spatial dependence of the intensity of the anti-diagonal, $\vec{a} = (\vec{x} - \vec{y})/\sqrt{2}$, polarization component of the light beam from the multimode optical fiber, $I^a(x,y)$, given by the Equation:

$$I^a(x,y) = |\vec{u}(x,y) \cdot \vec{a}|^2 \tag{5d}$$

The image capture device captures the transverse, spatial dependence of the intensity of the transverse, spatial dependence of the intensity of the right-circular, $\vec{r} = (\vec{x} + i\vec{y})/\sqrt{2}$, polarization component of the light beam from the multimode optical fiber, $I^r(x, y)$, given by the Equation:

$$I^r(x,y) = |\vec{u}(x,y) \cdot \vec{r}|^2 \tag{5e}$$

The image capture device captures the transverse, spatial dependence of the intensity of the transverse, spatial dependence of the intensity of the left circular, $\vec{l} = (\vec{x} - i\vec{y})/\sqrt{2}$, polarization component of the light beam from the multimode optical fiber, $I^l(x, y)$, given by the Equation:

$$I^l(x,y) = |\vec{u}(x,y) \cdot \vec{a}|^2 \tag{5f}$$

The complex amplitude of the electric field of the light beam from the multimode optical fiber, whose alignment, size, and wave front vary with respect to the image capture device, is given by the equation:

$$\vec{u}'(x + \delta x, y + \delta y; w + \delta w) = \tag{6}$$
$$\vec{u}(x + \delta x, y + \delta y; w + \delta w) \times \exp(i\phi(x + \delta x, y + \delta y, w + \delta w)),$$

where $\phi(x+\delta x, y+\delta y; w+\delta w)$ is the wave front of the light beam, which can be described as a linear combination of Zernike polynomials, given by the equation:

$$\phi(r'; \theta'; w') = \tag{7}$$
$$\sum_{m=0}^{m} A_{i,0} R_{i,0}(r'; w') + \sum_{i=1}^{\infty} \sum_{i=1}^{j} R_{i,j}(r'; w')\{A_{i,j}\cos(j\theta') + B_{i,j}\sin(j\theta')\},$$

$$r' = \left(\sqrt{(x + \delta x)^2 + (y + \delta y)^2}\right), \tag{7a}$$

$$\theta' = \tan^{-1}\left(\frac{y + \delta y}{x + \delta x}\right), \tag{7b}$$

$$w' = w + \delta w, \tag{7c}$$

where $R_{i,j}(r'; w')$ is the radial Zernike polynomial, and $A_{i,j}$ and $B_{i,j}$ are coefficients, and i,j=0, 1, 2, . . . .

The transverse, spatial dependencies of the intensities of the light beam from the multimode optical fiber and, that of its $\vec{x}$ polarization component and the $\vec{y}$ polarization component, whose alignment, size, and wave front (e.g. curvature, etc.) vary with respect to the image capture device, given by Equation 6, are given by the equations:

$$I^{x'}(x + \delta x, y + \delta y; w + \delta w) = |u^{x'}(x + \delta x, y + \delta y; w + \delta w)|^2 \tag{8b}$$

$$I^{y'}(x + \delta x, y + \delta y; w + \delta w) = |u^{y'}(x + \delta x, y + \delta y; w + \delta w)|^2 \tag{8c}$$

Figure 4:
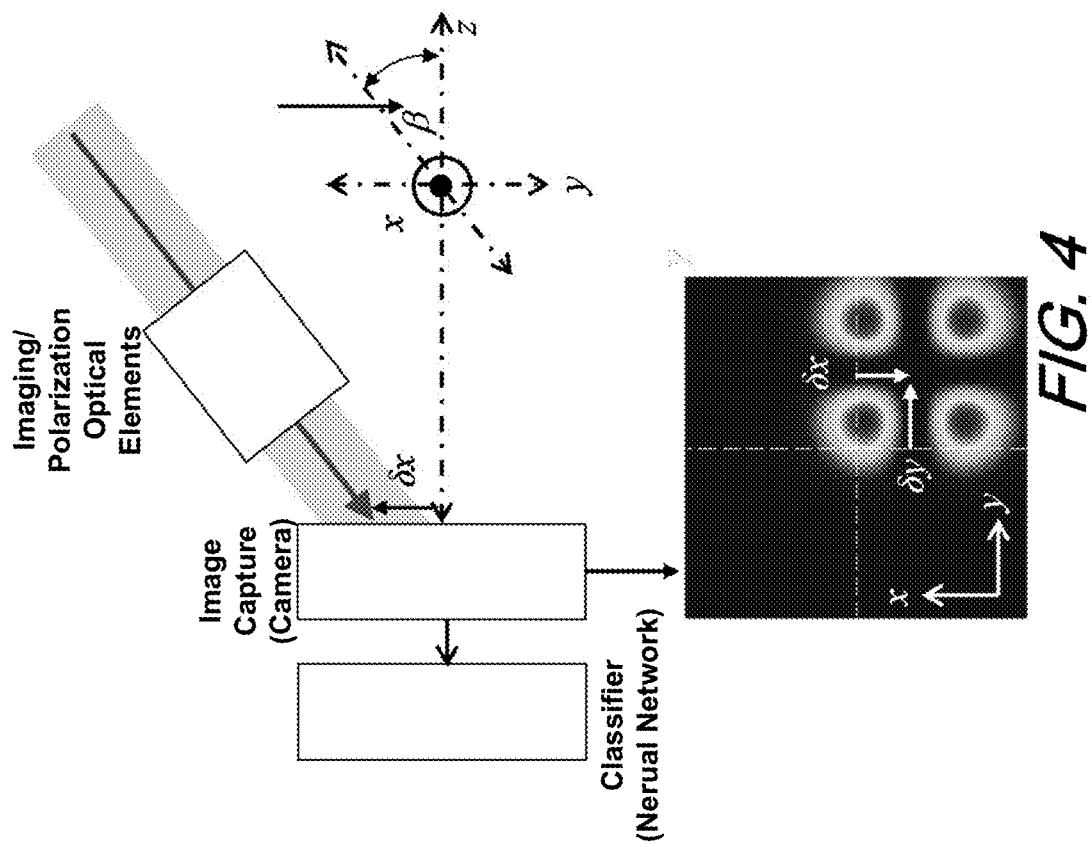
FIG. 4 shows a schematic block diagram(s) of illustrative displacements of the light beams after polarization splitting according to aspects of the present disclosure.
Figure 4:
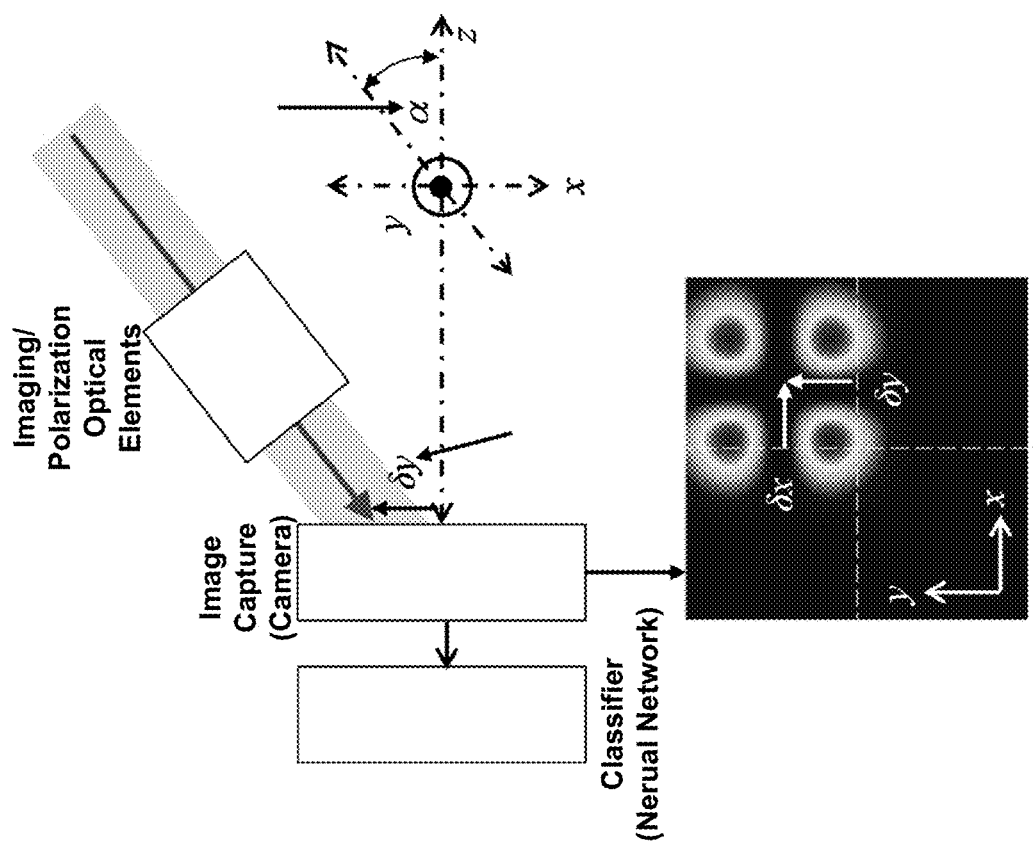
Figure 5C:
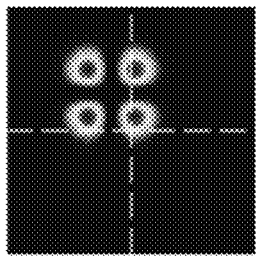
Figure 5C:
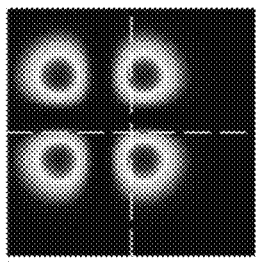
Figure 5C:
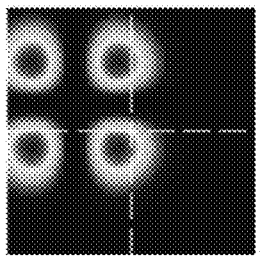
Figure 5C:
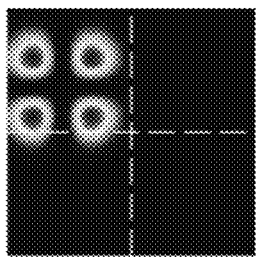
Figure 5C:
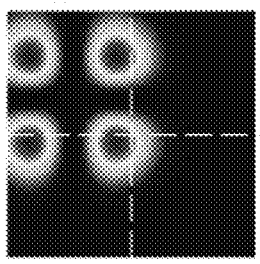
Figure 5D:
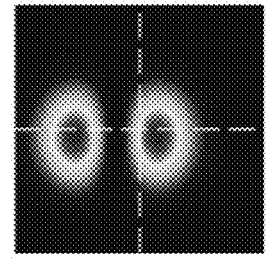
Figure 5D:
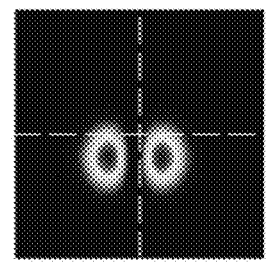
Figure 5D:
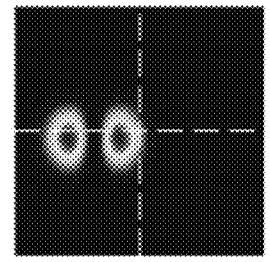
Figure 5D:
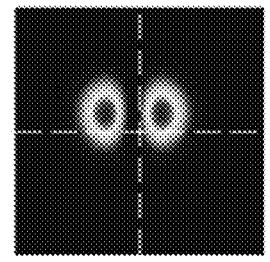

FIG. 4 shows a schematic block diagram(s) of illustrative displacements of the light beams after polarization splitting according to aspects of the present disclosure.

The center of the light beam is displaced an amount given by ox in the x-direction with respect to the z-axis. The center of the light beam is displaced an amount given by Oy in the y-direction with respect to the z-axis. The direction of propagation of the light beam makes an angle given by α in the y-z plane. The direction of propagation of the light beam makes an angle given by β in the x-z plane. The waist size of the light beam varies by an amount given by ow, and the wave front of the light beam has aberration, given by $\phi(x+\delta x, y+\delta y; w+\delta w)$, Equation 7.

As noted previously, the image capture device may advantageously comprises any device that records digital images of the transverse, spatial dependencies of the intensities of the more than one polarization components of the light beam from the multimode optical fiber, whose alignment, size, and wave front vary with respect to the image capture device.

In an illustrative arrangement, such device that records digital images of the transverse, spatial dependencies of the intensities of the more than one orthogonal polarization components of the light beam from the multimode optical fiber is a conventional pixelated camera.

Using a classifier, the digital images of the transverse, spatial dependencies of the intensities of the more than one polarization components of the light beam from the multimode optical fiber, whose alignment, size, and wave front vary with respect to the image capture device, are classified.

The classifier is trained off-line using synthesized training examples of numerically calculated transverse, spatial dependencies of higher-order spatial modes of the more than one polarization components of the light beam, comprising varying alignments, sizes, and wave fronts.

FIG. 5(A), FIG. 5(B), FIG. 5(C), and FIG. 5(D) are a series of numerically calculated and plotted transverse, spatial dependencies of the intensities of higher order spatial modes according to aspects of the present disclosure.

For example, the figure shows the numerically calculated transverse, spatial dependencies of the intensities of higher-order spatial modes are displaced an amount given by Ox in the x-direction with respect to the z-axis.

The figure shows the numerically calculated transverse, spatial dependencies of the intensities of higher-order spatial modes are displaced an amount given by δy in the y-direction with respect to the z-axis.

The figure shows the numerically calculated transverse, spatial dependencies of the intensities of higher-order spatial modes have waist sizes that vary by an amount given by: δw.

The numerically calculated transverse, spatial dependencies of the intensities of higher-order spatial modes are of the $\vec{x}$ polarization component of the light beam from the multimode optical fiber.

The numerically calculated transverse, spatial dependencies of the intensities of higher-order spatial modes are of the $\vec{y}$ polarization component of the light beam from the multimode optical fiber.

The numerically calculated transverse, spatial dependencies of the intensities of higher-order spatial modes are of the $\vec{d}$ polarization component of the light beam from the multimode optical fiber.

The numerically calculated transverse, spatial dependencies of the intensities of higher-order spatial modes are of the $\vec{a}$ polarization component of the light beam from the multimode optical fiber.

The numerically calculated transverse, spatial dependencies of the intensities of higher-order spatial modes are of the $\vec{r}$ polarization component of the light beam from the multimode optical fiber.

The numerically calculated transverse, spatial dependencies of the intensities of higher-order spatial modes are of the $\vec{l}$ polarization component of the light beam from the multimode optical fiber.

The synthesized training examples of higher-order spatial modes of the more than one polarization components of the light beam are numerically calculated, transverse, spatial dependencies of the intensities of higher-order spatial modes, whose alignment, size, and wave front vary with respect to the camera.

Shown, for example, the numerically calculated, transverse, spatial dependencies of the complex amplitudes of the electric fields and, the intensities of Hermite-Gaussian modes, whose alignment, size, and wave front vary with respect to the camera, are given by the equations, respectively:

$$HG_{m,n}(x+\delta x, y+\delta y; w+\delta w) = c_{m,n} H_{m,n}\left(\frac{(x+\delta x)\sqrt{2}}{w+\delta w}\right) \quad (9a)$$

$$H_n\left(\frac{(y+\delta y)\sqrt{2}}{w+\delta w}\right) \exp\left(\frac{-(x+\delta x)^2 - (y+\delta y)^2}{(w+\delta w)^2}\right),$$

$$I_{m,n}(x+\delta x, y+\delta y; w+\delta w) = |HG_{m,n}(x+\delta x, y+\delta y; w+\delta w)|^2, \quad (9b)$$

For example, the numerically calculate, transverse, spatial dependencies of the complex amplitudes of the electric fields and, the intensities of Laguerre-Gaussian modes, whose alignment, size, and wave front vary with respect to the camera, are given by the equations, respectively:

$$LG_{l,p}(r', \theta', w+\delta w) = \quad (10a)$$

$$c_{l,p} \exp\left(-\frac{(r')^2}{(w+\delta w)^2}\right) \left(\frac{(r')\sqrt{2}}{w+\delta w}\right)^{|l|} L_{l,p}\left(\frac{2(r')^2}{(w+\delta w)^2}\right) \exp(il\theta'),$$

$$I_{l,p}(x+\delta x, y+\delta y; w+\delta w) = |LG_{l,p}(r', \theta'; w+\delta w)|^2. \quad (10b)$$

The numerically calculate, transverse, spatial dependencies of the more than one polarization components of the complex amplitudes of the electric fields and, the intensities of higher-order modes, whose alignment, size, and wave front vary with respect to the camera, are linear combinations of higher-order spatial modes, as described in Equation 1, and given by the equations $$I^x = \left| \sum_{m=0}^{m_{totalx}} \sum_{n=0}^{n_{totalx}} c_{m,n}^x HG_{m,n}^x(x+\delta x, y+\delta y; w+\delta w) \right|^2, \quad (11a)$$

$$I^y = \left| \sum_{m=0}^{m_{totaly}} \sum_{n=0}^{n_{totaly}} c_{m,n}^y HG_{m,n}^y(x+\delta x, y+\delta y; w+\delta w) \right|^2, \quad (11b)$$

The numerically calculated transverse, spatial dependencies of higher-order spatial modes are given by the set of Stokes parameters:

$$S_0 = I^x(x+\delta x, y+\delta y; w+\delta w) + I^y(x+\delta x, y+\delta y; w+\delta w) \quad (12a)$$

$$S_1 = I^x(x+\delta x, y+\delta y; w+\delta w) - I^y(x+\delta x, y+\delta y; w+\delta w) \quad (12b)$$

$$S_2 = I^d(x+\delta x, y+\delta y; w+\delta w) - I^a(x+\delta x, y+\delta y; w+\delta w) \quad (12c)$$

$$S_3 = I^r(x+\delta x, y+\delta y; w+\delta w) - I^l(x+\delta x, y+\delta y; w+\delta w) \quad (12d)$$

Each numerically calculated transverse, spatial dependence of the intensity of the higher-order spatial modes or the linear combination of higher-order spatial modes or the set of Stokes parameters of the higher-order spatial modes is labelled by the complex coefficients of the higher-order spatial modes comprising that linear combination.

The complex coefficients labels comprising only the amplitudes of the higher-order spatial modes comprising that linear combination.

The complex coefficients labels comprising only the phases of the higher-order spatial modes comprising that linear combination.

The complex coefficients labels comprising only the powers of the higher-order spatial modes comprising that linear combination, i.e., the modulus square of the complex coefficients.

The classifier that classifies the image data that is captured by the image capture device of the transverse, spatial dependencies of the intensities of the more than one polarization components of the light beam from the multimode optical fiber, whose alignment, size, and wave front vary with respect to the image capture device is in an illustrative arrangement a convolutional neural network.

The Convolutional neural network comprises at least one fully connected layer. The dimension of the fully connected layer may be equal to the number of complex coefficients of each spatial mode for each of the more than one polarization component and each element of the fully connected layer corresponds to the amplitude of each mode.

The dimension of the fully connected layer may be equal to the number of complex coefficients of each spatial mode for each of the more than one polarization component and each element of the fully connected layer corresponds to the phase of each mode.

The dimension of the fully connected layer may be equal to the number of complex coefficients of each spatial mode for each of the more than one polarization component and each element of the fully connected layer corresponds to the modulus square of the complex coefficients.

The dimension of the fully connected layer may be equal to the number of amplitudes and phases of each spatial mode for each of the more than one polarization component and each element of the fully connected layer corresponds to the amplitude or phases of each mode.

The dimension of the input to the convolutional neural network may be proportional to the number of Stokes parameters and corresponds to the Stokes parameters of Eq. 12.

The dimension of the input to the convolutional neural network may be proportional to one or more of the transverse, spatial dependencies of the intensities of the light beam of the more than one polarization component from Eq. 5 and corresponds to those intensities.

The weights of the convolutional neural network are adjusted via a regression where the labels of each transverse, spatial dependencies of the intensities of the light beam from Eq. 5, or set of Stokes parameters from Eq. 13—the labels being the complex coefficients of the linear combination of higher-order spatial modes—are compared to the values of the fully connected layer.

To evaluate our inventive approach further, a convolutional neural network based on the LeNet architecture was used. The convolutional neural network comprised 3 convolutional layers, where the 1st convolutional layer had 32 3×3 filters, the 2nd layer had 64 3×3 filters and, the 3rd layer had 128 3×3 filters (i.e., the kernel size of all filters was 3×3). After each convolutional filter, there was a leaky rectifier linear unit then, a max pooling layer of size 2×2. Finally, after the last max pooling layer, there was a flatten layer, then a dense (fully connected) layer that comprised 128 units and, an output layer that comprised D units, where D is variable, corresponding to the number of spatial modes to decompose. In total, the convolutional neural network comprised approximately 896,132 trainable parameters.

The convolutional neural network was trained using an Adam optimizer, which used categorical cross entropy loss. 1000 training examples were used with a batch size of 64, where 800 of the training examples were used for training and, 200 of the training examples were used for validation. The size of each training example was 125×125×1. The convolutional neural network trained over 25 epochs. After each epoch, training accuracy and training loss and, validation accuracy and validation loss were calculated. Finally, after 25 epochs, 200 more training examples were passed through the convolutional neural network, with which a testing accuracy and a testing loss were calculated.

As a proof of principle, the convolutional neural network was trained and made to decompose a light beam into 3 constituent spatial modes: HG00, HG01, and HG10. Training examples and test examples of HG modes were synthesized by numerically calculating their transverse, spatially dependent intensities for random amplitudes and phases using the following equations:

$$u(x, y) = \sum_{m=0}^{M} \sum_{n=0}^{N} c_{m,n} HG_{m,n}(x, y),$$

where:

$$c_{m,n}^x = |c_{m,n}^x| \exp(i\varphi_{m,n}),$$

The sizes of the training examples and, the testing examples were 125×125×1.

Figure 6:
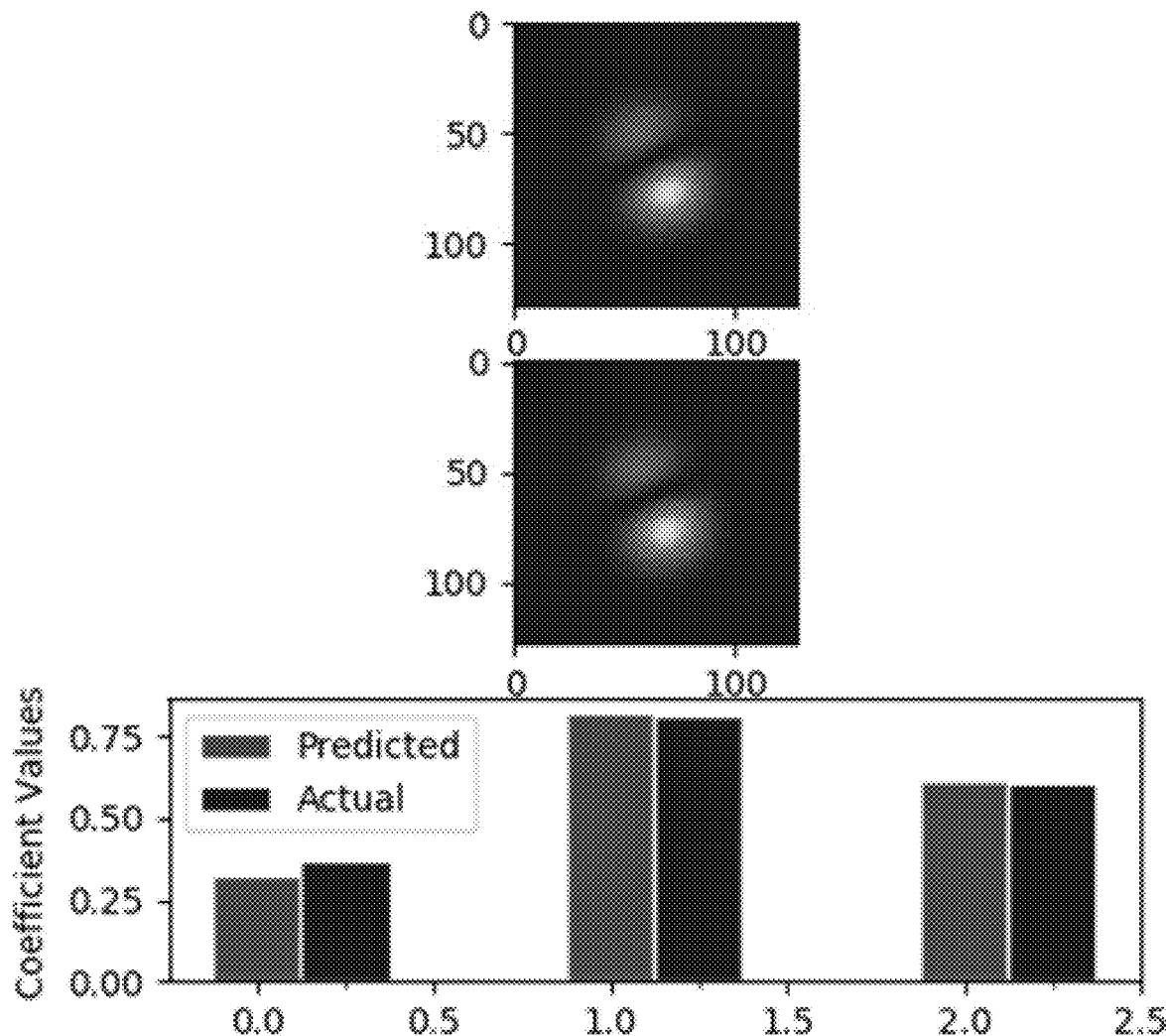
FIG. 6 shows numerical results for an experimental evaluation of a system and method according to aspects of the present disclosure.

FIG. 6 shows numerical results for an experimental evaluation of a system and method according to aspects of the present disclosure. As can be seen in FIG. 2, the predicted and actual power spectrum of the linear combination of spatial modes is similar. Additionally, the input light beam and the output light beam are similar.

Figure 7:
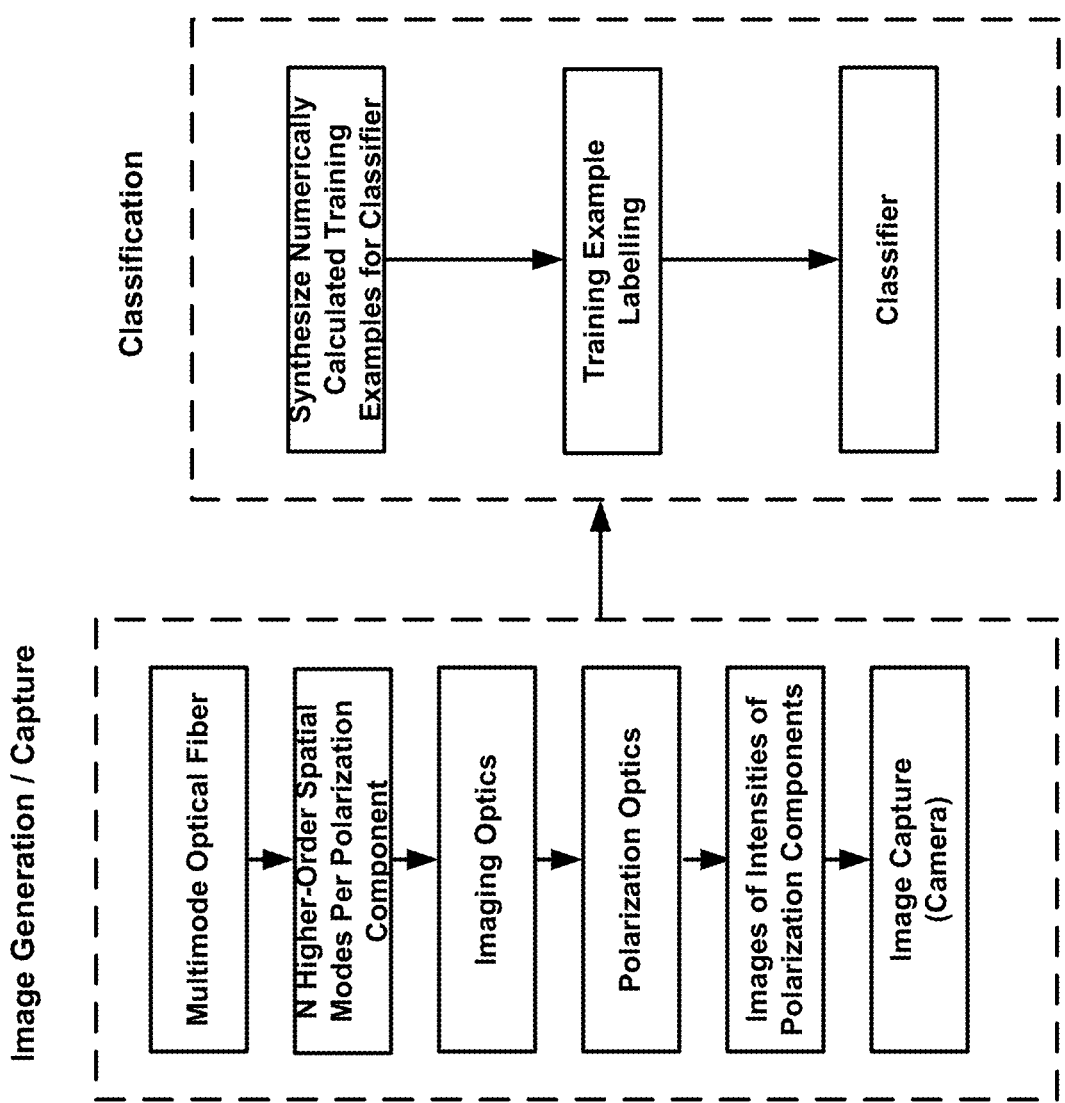
FIG. 7 is a schematic block/flow diagram showing illustrative elements and operation of systems and methods according to aspects of the present disclosure.

FIG. 7 is a schematic block/flow diagram showing an overview of illustrative elements and operation of systems and methods according to aspects of the present disclosure. As may be observed from that figure, operation according to aspects of the present disclosure generally includes image capture and classification.

Operationally, a multimode optical fiber conveying a light beam exhibiting N-higher-order spatial modes per polarization component is directed to optional, imaging optics which further direct the light beam to polarization optics and further directed to an image capture apparatus (camera) whereby images of the intensities of more than one polarization component of the light beam emitted from the multimode optical fiber are made and captured. A classifier neural network is trained through synthesized, numerically calculated training examples. The training example(s) are labelled and the classifier subsequently classifies the images so captured by the image capture device.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for classifying higher-order spatial modes comprising:
   providing a light beam emitted from an output of a multimode optical fiber, the light beam having two orthogonal polarization components, each including a linear combination of higher-order spatial modes;
   separating the two orthogonal polarization components into two separate light beams;
   recording digital images of the two separate light beams; and
   classifying, using a machine learning based classifier, the recorded digital images.

2. The method of claim 1 further comprising training the classifier using numerically calculated training examples.

3. The method of claim 1 wherein the recording digital images is effected by a digital camera.

4. The method of claim 3 further comprising:
   optically imaging the emitted light beam through the effect of imaging optics prior to the separation of the two orthogonal polarization components into two separate light beams.

5. The method of claim 4 wherein the imaging optics include one or more lenses.

6. The method of claim 5 wherein the multimode optical fiber and the digital camera are not placed in a focal region of the lenses.

7. The method of claim 3 wherein the camera records digital images of the transverse, spatial dependencies of the intensities of the two orthogonal polarization components of the light beam, whose alignment, size, and wavefront vary with respect to the digital camera.

8. The method of claim 7 wherein the center of an imaged light beam is displaced in the x-direction.

9. The method of claim 7 wherein the center of an imaged light beam is displaced in the y-direction.

10. The method of claim 7 wherein the direction of propagation of an imaged light beam forms an angle in the y-z plane.

11. The method of claim 7 wherein the direction of propagation of an imaged light beam forms an angle in the x-z plane.

12. The method of claim 7 wherein a waist size of an imaged light beam varies in time.

13. The method of claim 7 wherein a wave front of an imaged light beam exhibits an aberration.

14. The method of claim 1 wherein the higher order spatial modes are Hermite-Gaussian modes.

15. The method of claim 1 wherein the higher order spatial modes are Laguerre-Gaussian modes.

16. The method of claim 1 wherein the two orthogonal polarization components of the light beam are one selected from the group consisting of: horizontal/vertical, diagonal/antidiagonal, and right/left circular.

17. The method of claim 1 wherein the classifier is trained using numerically calculated training examples including varying alignments, sizes, and wave fronts.

18. The method of claim 17 wherein the numerically calculated training examples include higher order spatial modes having waists that vary.

19. The method of claim 17 wherein the numerically calculated training examples include at least one of: higher order spatial modes displaced in the x-direction, or higher order spatial modes displaced in the y-direction.

* * * * *